(12) United States Patent
Pan et al.

(10) Patent No.: US 12,265,299 B1
(45) Date of Patent: Apr. 1, 2025

(54) METHOD FOR PREPARING NANOSIZED MIXED CRYSTAL OF CYANURIC ACID COATED HALIDE PEROVSKITE AND USE THEREOF

(71) Applicant: SOOCHOW UNIVERSITY, Suzhou (CN)

(72) Inventors: Qi Pan, Suzhou (CN); Muhan Cao, Suzhou (CN); Jie Fu, Suzhou (CN); Jingjing Hu, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 0 days.

(21) Appl. No.: 17/912,746

(22) PCT Filed: Dec. 30, 2021

(86) PCT No.: PCT/CN2021/143116
§ 371 (c)(1),
(2) Date: Sep. 19, 2022

(87) PCT Pub. No.: WO2023/065535
PCT Pub. Date: Apr. 27, 2023

(30) Foreign Application Priority Data

Oct. 19, 2021 (CN) .......................... 202111217328.5

(51) Int. Cl.
*G02F 1/13357* (2006.01)
*C09K 11/02* (2006.01)
(Continued)

(52) U.S. Cl.
CPC ...... *G02F 1/133606* (2013.01); *C09K 11/025* (2013.01); *C09K 11/665* (2013.01);
(Continued)

(58) Field of Classification Search
CPC ......... G02F 1/133606; G02F 1/133603; C09K 11/025; C09K 11/665; C09K 11/883
See application file for complete search history.

(56) References Cited

U.S. PATENT DOCUMENTS

2024/0376374 A1* 11/2024 Park ....................... G06K 19/18

FOREIGN PATENT DOCUMENTS

| CN | 113480996 A | 10/2021 |
|----|-------------|---------|
| CN | 115968394 A * | 4/2023 |
| WO | 2020130592 A1 | 6/2020 |

OTHER PUBLICATIONS

Machine translation of CN115968394A (Year: 2023).*

(Continued)

*Primary Examiner* — Anne M Hines
(74) *Attorney, Agent, or Firm* — SZDC Law PC

(57) ABSTRACT

The invention provides a method for preparing a nanosized mixed crystal of cyanuric acid-coated halide perovskite, and use thereof. The method includes: (1) dispersing cesium halide, a lead salt, and urea in water, and stirring to obtain a mixed solution; and (2) adding phosphoric acid to the mixed solution, and subjecting to microwave heating, to obtain a solid after water is evaporated off, which is allowed to stand to obtain the nanosized mixed crystal of cyanuric acid coated halide perovskite. The method is simple, reproducible, and low in cost, with which mass production is achievable, and the emission wavelength of the obtained product is adjustable within a certain range through heat treatment. Due to the passivation and protection effects of cyanuric acid on halide perovskite, the prepared nanosized mixed crystal has excellent luminescence performance and stability, and is useful in the preparation of a high-color-point quantum dot brightness enhancement film.

10 Claims, 6 Drawing Sheets

(51) Int. Cl.
*C09K 11/66* (2006.01)
*C09K 11/88* (2006.01)
*B82Y 20/00* (2011.01)
*B82Y 40/00* (2011.01)

(52) U.S. Cl.
CPC ...... *C09K 11/883* (2013.01); *G02F 1/133603* (2013.01); *B82Y 20/00* (2013.01); *B82Y 40/00* (2013.01)

(56) References Cited

OTHER PUBLICATIONS

Qi Pan et al., "Microwave-Assisted Synthesis of High-Quality All-Inorganic $CsPbX_3$ (X=Cl, Br, I) Perovskite Nanocrystals and the Application in Light Emitting Diode" Journal of Materials Chemistry C, vol. 55, No. 42, pp. 10947-10954 (Sep. 9, 2017).

Yifei Yue et al., "Molecular engineering of s-triazine and its derivatives applied in surface modification strategy for enhancing photoelectric performance of all-inorganic perovskites" Chinese Chemical Letters 33 (2022) 547-550 (Jul. 1, 2021).

\* cited by examiner

METHOD FOR PREPARING NANOSIZED MIXED CRYSTAL OF CYANURIC ACID COATED HALIDE PEROVSKITE AND USE THEREOF

This application is the National Stage Application of PCT/CN2021/143116, filed on Dec. 30, 2021, which claims priority to Chinese Patent Application No. 202111217328.5, filed on Oct. 19, 2021, which is incorporated by reference for all purposes as if fully set forth herein.

FIELD OF THE INVENTION

The present invention relates to the field of luminescent materials, and in particular to a method for preparing a cyanuric acid-coated halide perovskite nanosized mixed crystal and use thereof.

DESCRIPTION OF THE RELATED ART

Inorganic halide perovskite quantum, due to readily adjustable band gap, broad spectral absorption, large absorption coefficient of light, long migration distance of carriers, high fluorescence emission efficiency and other excellent optoelectronic properties, can emit light of different colors by changing the types and proportions of halogen atoms in the crystal structure, and is thus widely used in solar cells, light emitting diodes, optoelectronic detectors, lasers and other high-performance optoelectronic devices.

Although the inorganic halide perovskite material-based quantum dot has excellent optical properties, due to the ionic nature of the crystal structure, the high mobility of halide and low crystal formation energy, the perovskite quantum dot is caused to have poor stability. The ionic nature of the crystal structure causes the perovskite quantum dot to be easily degraded by polar solvents and water in the environment to lose its optical properties, which seriously affects the service life of devices comprising such a material. At present, an inorganic salt or an organic matter is used to passivate the surface of perovskite, or, the surface of perovskite is coated with TMOS/TEOS to improve the stability of the perovskite quantum dot. However, such treatment methods are cumbersome and costive, and have difficulty for use in mass production and actual production. Therefore, how to lower the cost and effectively improve the stability of halide perovskite quantum dot is an urgent problem to be solved.

SUMMARY OF THE INVENTION

To solve the above problems, the present invention provides a method for preparing a cyanuric acid-coated halide perovskite nanosized mixed crystal, and use thereof. A nanosized mixed crystal of cyanuric acid coated halide perovskite is prepared with cesium halide, lead acetate trihydrate, urea and phosphoric acid by microwave heating. A cyanuric acid molecule is formed from urea under the action of microwaves, and then the cyanuric acid molecule is polymerized under the action of the P=O bond of phosphoric acid to form a cross-linked network structure. The cyanuric acid polymer acts as a ligand to and is coated on the halide perovskite, to exert an passivation and protection effect. This greatly improves the stability of the halide perovskite nanocrystals. The emission wavelength of the nanosized mixed crystal of cyanuric acid coated halide perovskite is adjustable by adjusting the temperature and time of subsequent heating treatment. The preparation method is simple, reproducible, and low in cost, with which mass production is achievable, and the prepared nanosized mixed crystal has high stability. Through the above method, a nanosized mixed crystal of cyanuric acid coated $CsPbBr_3$ ($CsPbBr_3$@CA) emitting dark green light, and having high color point and high quantum yield is prepared which is useful in the preparation of a quantum dot brightness enhancement film, and can achieve 96% coverage of Rec.2020 after combination with a commercial red light emitting CdSe@ZnS quantum dot brightness enhancement film.

The present invention provides the following technical solutions.

In a first aspect, the present invention provides a method for preparing a nanosized mixed crystal of cyanuric acid coated halide perovskite, which comprises the following steps:

(1) dispersing cesium halide, a lead salt, and urea in water, and stirring until uniform to obtain a mixed solution, wherein the lead salt is selected from the group consisting of lead bromide, lead nitrate, lead acetate, and a hydrate thereof and any combination thereof (2) adding phosphoric acid to the mixed solution, and subjecting to microwave heating, to obtain a solid after water is evaporated off, which is allowed to stand to obtain the nanosized mixed crystal of cyanuric acid coated halide perovskite.

Cyanuric acid is formed from urea under the action of microwaves, and then the cyanuric acid molecule is polymerized under the action of P=O bond in a phosphoric acid-containing system to form a cross-linked network structure of non-conjugated groups. In the reaction system, lead in $CsPbX_3$ is reactive with oxygen in the cyanuric acid polymer molecule, to form a Pb—O bond, thus passivating the surface of $CsPbX_3$, and form a stable perovskite structure. Moreover, the network structure of the cyanuric acid polymer is coated on $CsPbX_3$, to isolate $CsPbX_3$ nanocrystals to avoid agglomeration, and prevent the influence of external environment on the structure and properties of $CsPbX_3$ nanocrystals.

Preferably, in Step (1), the molar ratio of the lead salt to urea is 1:50-200 mmol/g.

Preferably, in Step (2), phosphoric acid is added in a volume at a ratio to the moles of the lead salt of 0.5-5:1 mL/mmol, and the phosphoric acid is an 85 wt % aqueous solution.

Phosphoric acid acts as an acid catalyst to promote the dehydration and carbonization of urea during the reaction, and act as a crosslinking agent for cyanuric acid polymerization, to allow the cyanuric acid molecule to form a cross-linked network structure.

Preferably, the power of the microwave heating is 600-850 W.

Preferably, in Step (2), the standing time is more preferably 5-10 min.

Preferably, the nanosized mixed crystal of cyanuric acid coated halide perovskite obtained in Step (2) is thermally treated, to adjust the emission wavelength of the nanosized mixed crystal, where the thermal treatment temperature is 50-120° C., and the thermal treatment time is 2 min-2 h.

Due to the potential influence of temperature and humidity during microwave heating, the emission wavelength of the prepared nanosized mixed crystal of cyanuric acid coated halide perovskite varies within a certain range. The solid obtained after microwave heating is thermally treated, and the degree of polymerization of the cyanuric acid polymer is controlled by adjusting the temperature and time of the thermal treatment, to have an impact on the size of the network structure of the cyanuric acid polymer, and further on the size of the coated $CsPbX_3$ nanocrystals, so that the emission wavelength of the nanosized mixed crystal of cyanuric acid coated halide perovskite is adjustable within a certain range. As a result, a nanosized mixed crystal with target emission wavelength is obtained.

Preferably, at a thermal treatment temperature of 85° C., and by controlling the thermal treatment time, the emission wavelength of the nanosized mixed crystal of cyanuric acid coated $CsPbBr_3$ is adjustable in the range of 514-532 nm.

In a second aspect, the present invention provides a nanosized mixed crystal of cyanuric acid coated halide perovskite prepared through the method according to the first aspect. The halide perovskite has a general chemical formula of $CsPbX_3$, in which X is selected from the group consisting of Cl, Br, I and any combination thereof.

In a third aspect, the present invention provides a quantum dot brightness enhancement film, which comprises two layers of barrier films and a light-emitting layer material. The quantum dot brightness enhancement film is obtained by sandwiching a light-emitting layer material between two layers of barrier films, and curing. The light-emitting layer material is obtained by mixing the nanosized mixed crystal of cyanuric acid coated halide perovskite described in the second aspect with an adhesive.

Preferably, when the halide perovskite is $CsPbBr_3$, the prepared $CsPbBr_3$@CA quantum dot brightness enhancement film emits green light under UV irradiation; and when the halide perovskite is $CsPbBr_{1.5}I_{1.5}$, the prepared $CsPbBr_{1.5}I_{1.5}$@CA quantum dot brightness enhancement film emits red light under UV irradiation.

Preferably, the $CsPbBr_3$@CA quantum dot brightness enhancement film has a emission wavelength of 525 nm, and a peak width at half height of 23 nm; and the $CsPbBr_{1.5}I_{1.5}$@CA quantum dot brightness enhancement film has a emission wavelength of 630 nm, and a peak width at half height of 46 nm.

According to the requirements of next-generation display, the newly defined International Telecommunication Union (ITU) BT 2020 (Rec.2020) standard requires a super-green luminescent material to have an emission wavelength of 525-535 nm, and a peak width at half height of less than 25 nm. A most desirable high-color image to be displayed can be attained only when this standard is met. The existing dark green light emitting material $CsPbBr_3$ has problems such as cumbersome preparation process, high cost, and poor stability.

In a fourth aspect, the present invention provides a quantum dot liquid crystal display, which comprises sequentially, from top to bottom, a liquid crystal display panel, a brightness enhancement film, a diffusion film, a green light emitting film, a red light emitting film, a light guide plate, and a blue LED. The green light emitting film is the $CsPbBr_3$@CA quantum dot brightness enhancement film described in the third aspect.

Preferably, when the green light emitting film is a $CsPbBr_3$@CA quantum dot brightness enhancement film having a color point of (0.17, 0.79), and the red light emitting film is a $CsPbBr_{1.5}I_{1.5}$@CA quantum dot brightness enhancement film having a color point of (0.67, 0.30), the quantum dot liquid crystal display has a color space that is 90% of Rec.2020 standard.

Preferably, when the green light emitting film is a $CsPbBr_3$@CA quantum dot brightness enhancement film having a color point of (0.17, 0.79), and the red light emitting film is a CdSe@ZnS quantum dot brightness enhancement film having a color point of (0.70, 0.29), the quantum dot liquid crystal display has a color space that is 96% of Rec.2020 standard.

Compared with related art, the present invention has the following beneficial effects.

1. In the present invention, nanosized mixed crystals of cyanuric acid coated halide perovskite with different luminescent colors and stable properties are prepared by microwave heating. Compared with the traditional preparation and modification methods of halide perovskite, the preparation method is simple, fast, low in cost, reproducible, and productive thus being suitable for use in commercial mass production.

2. In the preparation of the nanosized mixed crystal of cyanuric acid coated halide perovskite in the present invention, cyanuric acid acts as a ligand to passivate halide perovskite, and the network structure formed therewith is coated on the halide perovskite, to provide a protection and isolation effect. This greatly improves the stability of the halide perovskite nanocrystals. and increases the service life of devices comprising such a material.

3. The $CsPbBr_3$@CA nanosized mixed crystal prepared in the present invention can generate dark green light under UV irradiation, with a wavelength and a peak width at half height meeting Rec.2020 standard (wavelength ≥525 nm, and peak width at half height <25 nm). The green light emitting quantum dot brightness enhancement film prepared therewith shows a super high color point (0.17, 0.79), and is useful in a quantum dot display. 4. When a composite film prepared with the $CsPbBr_3$@CA quantum dot brightness enhancement film prepared in the present invention and a red light emitting CdSe@ZnS quantum dot brightness enhancement film is used in a quantum dot display, 96% coverage of Rec.2020 can be achieved, so it can be used in actual production and application.

DETAILED DESCRIPTION OF THE PREFERRED EMBODIMENTS

The present invention will be further described below with reference to the accompanying drawings and specific examples, so that those skilled in the art can better understand and implement the present invention; however, the present invention is not limited thereto.

Unless otherwise defined, all technical and scientific terms used herein have the same meaning as commonly understood by persons skilled in the art to which the present invention pertains. The terms used in the descriptions of the present invention are for the purpose of describing specific embodiments only and are not intended to limit the present invention. The term "and/or" as used herein includes any and all combinations of one or more of the listed related items.

Unless otherwise stated, the experimental methods given in examples below are all conventional methods. The materials, and reagents involved in the examples are commercially available, unless otherwise specified.

Example 1. Microwave Method: Preparation of CsPbBr$_3$@CA Nanosized Mixed Crystal Using Lead Acetate Trihydrate as Bromine Source 0.3 mmol of cesium bromide, 0.1 mmol of lead acetate trihydrate and 1.5 g of urea were dissolved in 10 mL of deionized water, and ultrasonically stirred for 5 min, to obtain a uniformly mixed solution. 0.2 mL of phosphoric acid was added to the mixed solution, the prepared solution was heated in a microwave oven at 700 W for 3 min, and deionized water was evaporated off, to obtain a white lumpy powder. The powder was allowed to stand at room temperature for 5-10 min, and a yellow-green perovskite powder was formed (as shown in FIG. 2a), which emitted bright green light under UV irradiation (as shown in FIG. 2b).

The prepared yellow-green perovskite powder was characterized by fluorescence spectroscopy, XRD, transmission electron microscopy, high-angle annular dark-field scanning transmission electron microscopy, and elemental mapping microscopy.

Figure 1:
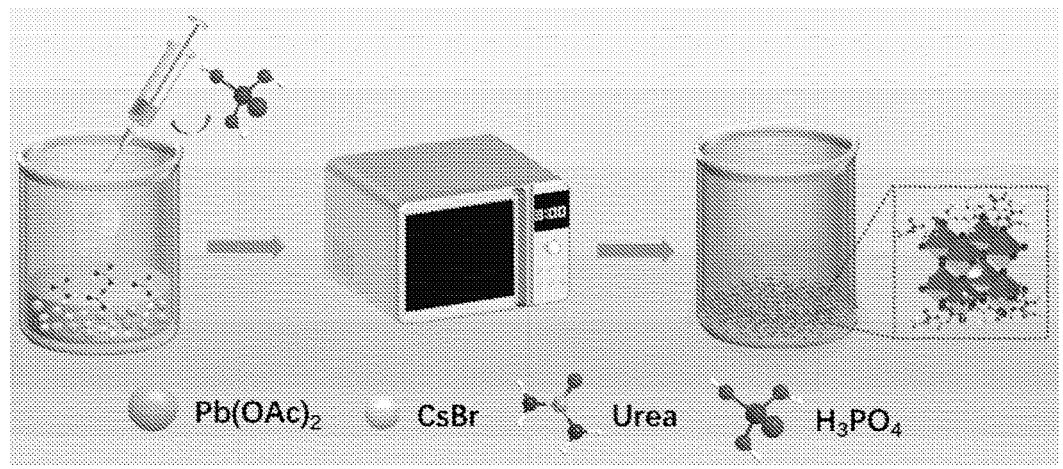
FIG. 1 shows a flow chart of a process for preparing $CsPbBr_3$@CA nanosized mixed crystal in Example 1.
Figure 2:
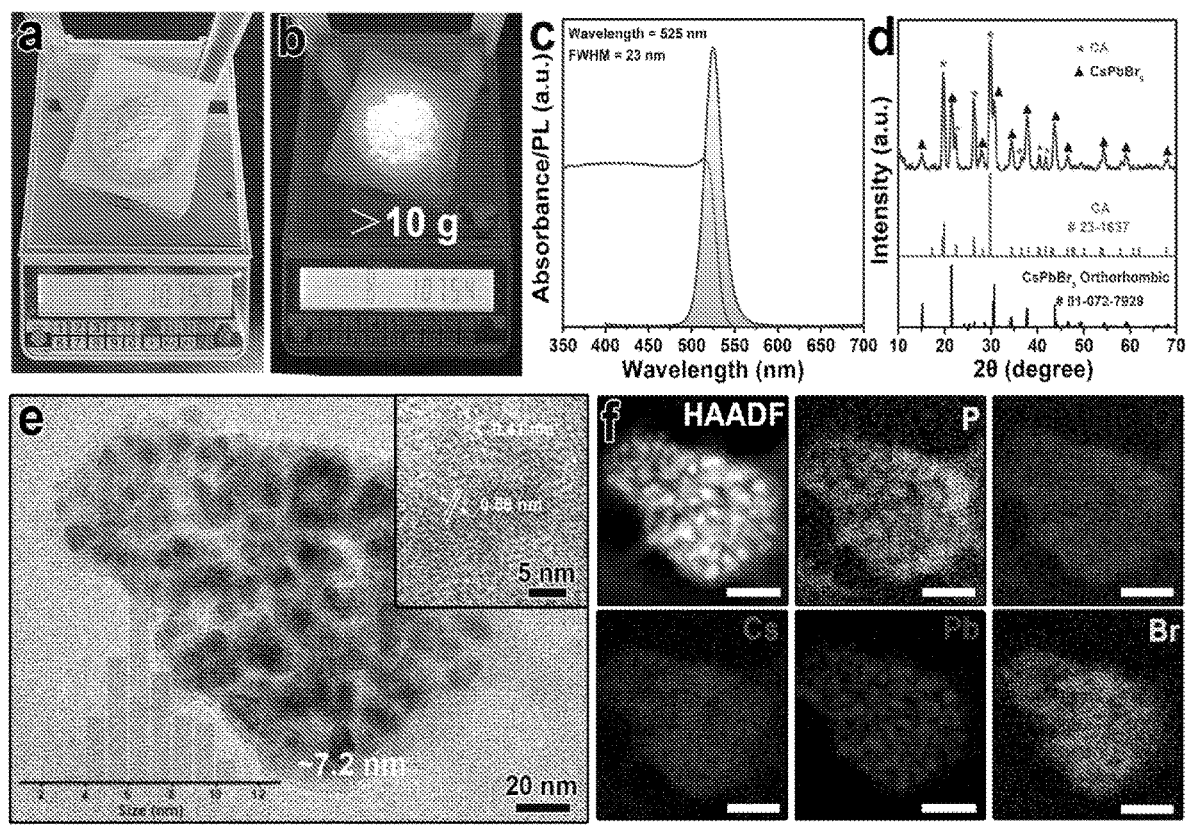
FIG. 2a shows the $CsPbBr_3$@CA nanosized mixed crystal prepared in Example 1.
FIG. 2b shows the luminescence of $CsPbBr_3$@CA nanosized mixed crystal prepared in Example 1 under UV irradiation.
FIG. 2c shows a fluorescence spectrum of $CsPbBr_3$@CA nanosized mixed crystal prepared in Example 1.
FIG. 2d shows an overlapped XRD pattern of $CsPbBr_3$@CA nanosized mixed crystal prepared in Example 1, orthorhombic $CsPbBr_3$, and cyanuric acid.
FIG. 2e shows a transmission electron microscopy (TEM) image of $CsPbBr_3$@CA nanosized mixed crystal prepared in Example 1.
FIG. 2f shows a high-angle annular dark-field scanning transmission electron microscopy (HAADF-STEM) image and an elemental mapping spectrum of $CsPbBr_3$@CA nanosized mixed crystal prepared in Example 1.

FIG. 2c shows a fluorescence spectrum of the yellow-green perovskite powder. As can be known, the emission wavelength of the yellow-green perovskite powder is 525 nm, the peak width at half height is merely 23 nm, and the quantum yield is as high as 90%.

FIG. 2d shows an overlapped XRD pattern of the yellow-green perovskite powder, orthorhombic CsPbBr$_3$ (#01-072-7929), and cyanuric acid (#23-1637). As can be seen, the diffraction peak of the yellow-green perovskite powder is formed of the diffraction peaks of orthorhombic CsPbBr$_3$ and cyanuric acid. This indicates that the prepared yellow-green perovskite powder is a nanosized mixed crystal of cyanuric acid and CsPbBr$_3$ (that is, CsPbBr$_3$@CA).

FIG. 2e shows a TEM image of CsPbBr$_3$@CA nanosized mixed crystal. As can be seen, the CsPbBr$_3$ nanocrystal is coated by a cyanuric acid polymer, where the average size of CsPbBr$_3$ is about 7.2 nm. FIG. 2e shows a high-resolution TEM image at the upper right corner. The interplanar spacing of CsPbBr$_3$ is measured to be about 058 nm and 0.41 nm, which correspond to the 100 and 110 crystal planes of orthorhombic CsPbBr$_3$ respectively, further confirming the formation of CsPbBr$_3$. Moreover, the HAAFD-STEM and elemental mapping spectra show the element distribution in CsPbBr$_3$@CA nanosized mixed crystal. As shown in FIG. 2f, CsPbBr$_3$ is relatively evenly distributed inside the polymer, the C, O, N, and P elements in cyanuric acid are uniformly distributed on the surface and exterior of CsPbBr$_3$ to form a coating, and Cs, Pb, and Br elements are distributed at a central position in the CsPbBr$_3$@CA nanosized mixed crystal.

From the above characterization results, it can be seen that in the CsPbBr$_3$@CA nanosized mixed crystal prepared in this example, CsPbBr$_3$ is evenly distributed insider the cyanuric acid polymer. To further study the functional groups and surface chemical state of CsPbBr$_3$@CA nanosized mixed crystal, it was characterized by FT-IR and X-ray photoelectron spectroscopy.

Figure 3:
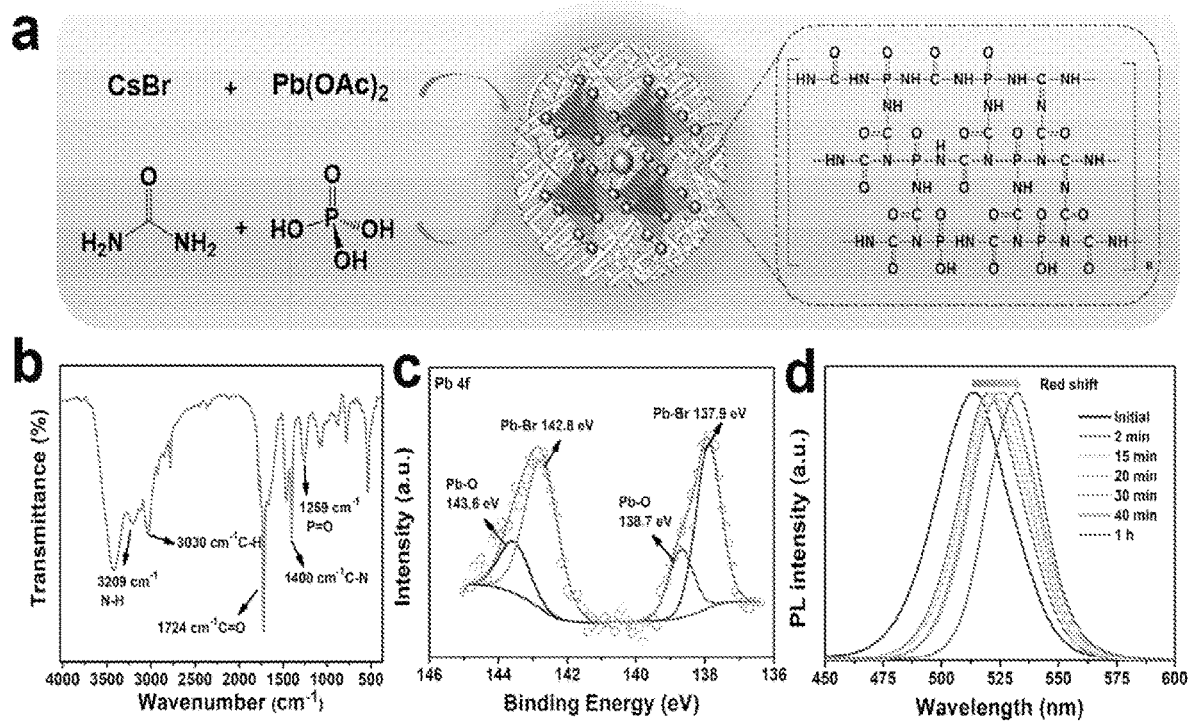
FIG. 3a shows the mechanism of formation of $CsPbBr_3$@CA nanosized mixed crystal prepared in Example 1.
FIG. 3b shows an FT-IR spectrum of $CsPbBr_3$@CA nanosized mixed crystal prepared in Example 1.
FIG. 3c shows an X-ray photoelectron spectrum of $CsPbBr_3$@CA nanosized mixed crystal prepared in Example 1.
FIG. 3d shows fluorescence spectra of CsPbBr$_3$@CA nanosized mixed crystal prepared with various thermal treatment time in Example 2.

As shown in FIG. 3b, strong stretching vibration bands can be observed at 3209 cm$^{-1}$ (N—H) and 3030 cm$^{-1}$ (C—H), and stretching vibration bands are observed at 1724 cm$^{-1}$ (C=O) and 1400 cm$^{-1}$ (C—N), which are attributed to the main stretching vibration peak of cyanuric acid molecule. Moreover, an obvious stretching vibration band of P=O bond is observed at 1259 cm$^1$, which may be attributed to the fact that the cyanuric acid molecule is polymerized under the action of P=O bond in a phosphoric acid-system to form a cross-linked network structure of non-conjugated groups.

FIG. 3c shows a local X-ray photoelectron spectrum of CsPbBr$_3$@CA nanosized mixed crystal. The coordination environment of lead element is analyzed by the spectrum of the 4f orbital of Pb. As can be seen, peaks of Pb—Br bond are observed at 142.8 eV and 137.9 eV, and peaks attributed to Pb—O are observed at 143.6 eV and 138.7 eV. This is because the oxygen atom in the cyanuric acid polymer molecule forms a coordination bond Pb—O with the lead in CsPbBr$_3$.

It can be seen from the above results that cyanuric acid forms a cross-linked network structure under the action of phosphoric acid, which is coated on the CsPbBr$_3$ nanocrystal for protection. The oxygen atom in the cyanuric acid polymer forms a coordination bond P—O with the lead in CsPbBr$_3$, to passivate the surface of CsPbBr$_3$, thus further improving the stability of CsPbBr$_3$ nanocrystal.

Example 2: Adjustment of Emission Wavelength of CsPbBr$_3$@CA Nanosized Mixed Crystal by Thermal Treatment The preparation method of Example 1 was repeated to prepare a yellow-green perovskite powder. The obtained powder was divided into 7 equal portions and heated in an oven at 85° C. for 0, 2, 15, 20, 30, 40, and 60 min respectively. The powder without thermal treatment and powders after heat treatment were characterized by fluorescence spectroscopy. The characterization results are shown in FIG. 3d. The emission wavelength of the powder without thermal treatment is 514 nm, and with the increase of the thermal treatment time, the emission wavelength is increased from 514 nm to 532 nm.

It can be seen from the above results that the emission wavelength of CsPbBr$_3$@CA nanosized mixed crystal prepared by microwave method varies in a certain range due to the fluctuations of temperature and humidity. The emission wavelength of CsPbBr$_3$@CA nanosized mixed crystal is adjustable in the range of 514-532 nm through thermal treatment of the product, to obtain a CsPbBr3@CA nanosized mixed crystal with a target emission wavelength.

Example 3. Microwave Method: Preparation of CsPbBr$_3$@CA Nanosized Mixed Crystal Using Lead Bromide as Bromine Source 0.1 mmol of cesium bromide, 0.1 mmol of lead bromide and 1.5 g of urea were dissolved in 10 mL of deionized water, and ultrasonically stirred for 5 min, to obtain a uniformly mixed solution. 0.2 mL of phosphoric acid was added to the mixed solution, the prepared solution was heated in a microwave oven at 700 W for 3 min, and deionized water was evaporated off, to obtain a white lumpy powder. The powder was allowed to stand at room temperature for 5-10 min, and a yellow-green perovskite powder was formed, which emitted bright green light under UV irradiation.

Figure 4:
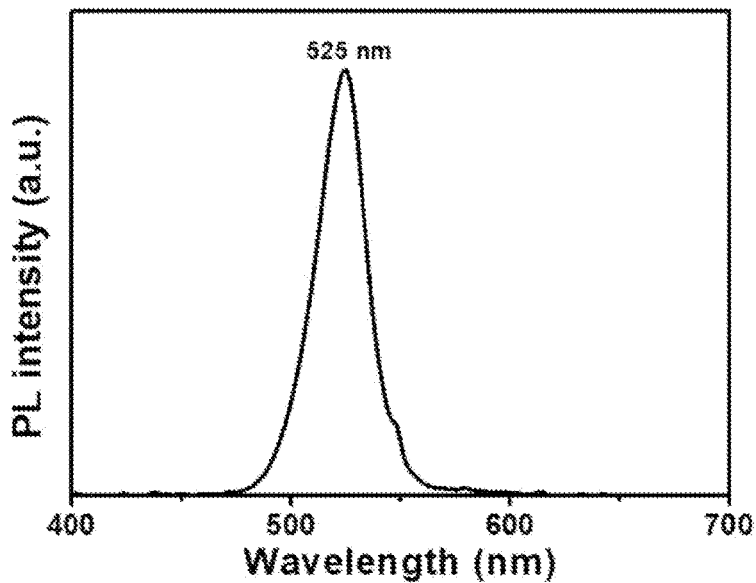
FIG. 4 shows a fluorescence spectrum of CsPbBr$_3$@CA nanosized mixed crystal prepared in Example 3.

The prepared yellow-green perovskite powder was characterized by fluorescence spectroscopy. The results are shown in FIG. 4. the emission wavelength is 525 nm.

Example 4. Microwave Method: Preparation of CsPbX$_3$@CA Nanosized Mixed Crystal with Various Ratios of Halides 0.3 mmol of cesium halide, 0.1 mmol of lead acetate trihydrate and 1.5 g of urea were dissolved in 10 mL of deionized water, and ultrasonically stirred for 5 min, to obtain a uniformly mixed solution. 0.2 mL of phosphoric acid was added to the mixed solution, the prepared solution was heated in a microwave oven at 700 W for 3 min, and deionized water was evaporated off, to obtain a white lumpy powder. The powder was allowed to stand at room temperature for 5-10 min, to form perovskite powders of respective colors.

Cesium halide was added at a controlled molar ratios of different halides, including, Cl/Br=2:1, 1:1, and 1:2, and Br/I=1:1, 2:1, and 3:0. CsPbCl$_2$Br@CA, CsPbCl$_{1.5}$Br$_{1.5}$@CA, CsPbClBr$_2$@CA, CsPbBr$_{1.5}$I$_{1.5}$@CA, CsPbBr$_2$I@CA, and CsPbI$_3$@CA nanosized mixed crystals were prepared respectively. The luminescent colors and emission wavelengths corresponding to different perovskites are shown in Table 1 below:

TABLE 1

| | Luminescent colors and emission wavelength of various samples | | | | | |
|---|---|---|---|---|---|---|
| Sample | CsPbCl$_2$Br @CA | CsPbCl$_{1.5}$Br$_{1.5}$ @CA | CsPbClBr$_2$ @CA | CsPbBr$_{1.5}$I$_{1.5}$ @CA | CsPbBr$_2$I @CA | CsPbI$_3$ @CA |
| Luminescent color | Blue | Blue-green | Green | Red | Orange | High red |
| Wavelength | 475 nm | 504 nm | 510 nm | 631 nm | 604 nm | 688 nm |

Comparative Example 1: Hot Injection: Preparation of CsPbBr$_3$ Nanocrystal

In this comparative example, CsPbBr$_3$ nanocrystal was prepared by hot injection. The specific steps were as follows.

① 0.2 g of Cs$_2$CO$_3$ (0.49 mmol), 1.25 mL of OA, and 20 mL of ODE were mixed in a 50 mL three-neck flask to prepare a cesium oleate solution. The above solution was dried at 120° C. for 1 h, and then heated under N$_2$ atmosphere to 150° C. until the reaction of Cs$_2$CO$_3$ with OA was completed, to obtain a hot cesium oleate solution.

② 1.23 mL of OAm, 1.17 mL of OA, 5 mL of ODE and 0.073 g of PbBr$_2$ were added to a 25 mL three-neck flask, dried under vacuum for 1 h, and then heated under N$_2$ atmosphere to 160° C., to obtain a mixed solution.

③ 0.4 mL of the hot cesium oleate solution prepared in step ① was quickly added to the mixed solution obtained in step ②. After 5 sec, the obtained reaction product was cooled to room temperature in an ice-water bath. The obtained crude solution was centrifuged at 9000 rpm for 5 min, and the supernatant was collected and dispersed in 10 mL of hexane, to prepare a $CsPbBr_3$ nanocrystal.

Stability Study

The stability of the $CsPbBr_3$@CA nanosized mixed crystal prepared in Example 1, the $CsPbBr_{1.5}I_{1.5}$@CA nanosized mixed crystal prepared in Example 4, and the $CsPbBr_3$ nanocrystal prepared in Comparative Example 1 against polar solvents was studied. The specific operations were as follows.

The above samples of equal amount were respectively added to and immersed in equal volume of ethanol, acetone, and dimethyl sulfoxide, and the luminescence intensity (quantum yield) of the samples was observed as a function of immersion time.

Figure 5:
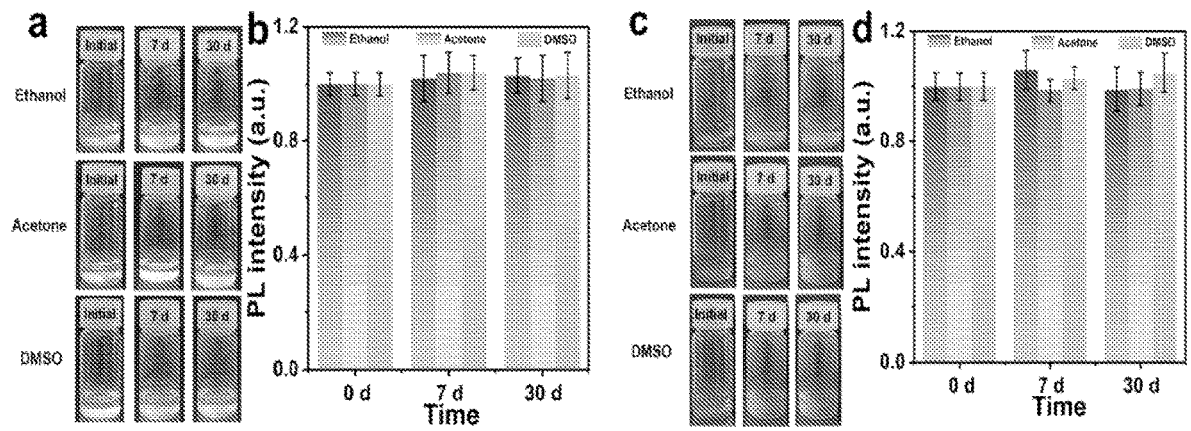
FIGS. 5a and 5b respectively show CsPbBr$_3$@CA nanosized mixed crystal immersed in ethanol, acetone, and dimethyl sulfoxide, and the changes in luminescence intensity corresponding to different immersion time.
FIGS. 5c, and 5d respectively show CsPbBr$_{1.5}$I$_{1.5}$@CA nanosized mixed crystal immersed in ethanol, acetone, and dimethyl sulfoxide, and the changes in luminescence intensity corresponding to different immersion time.
Figure 6:
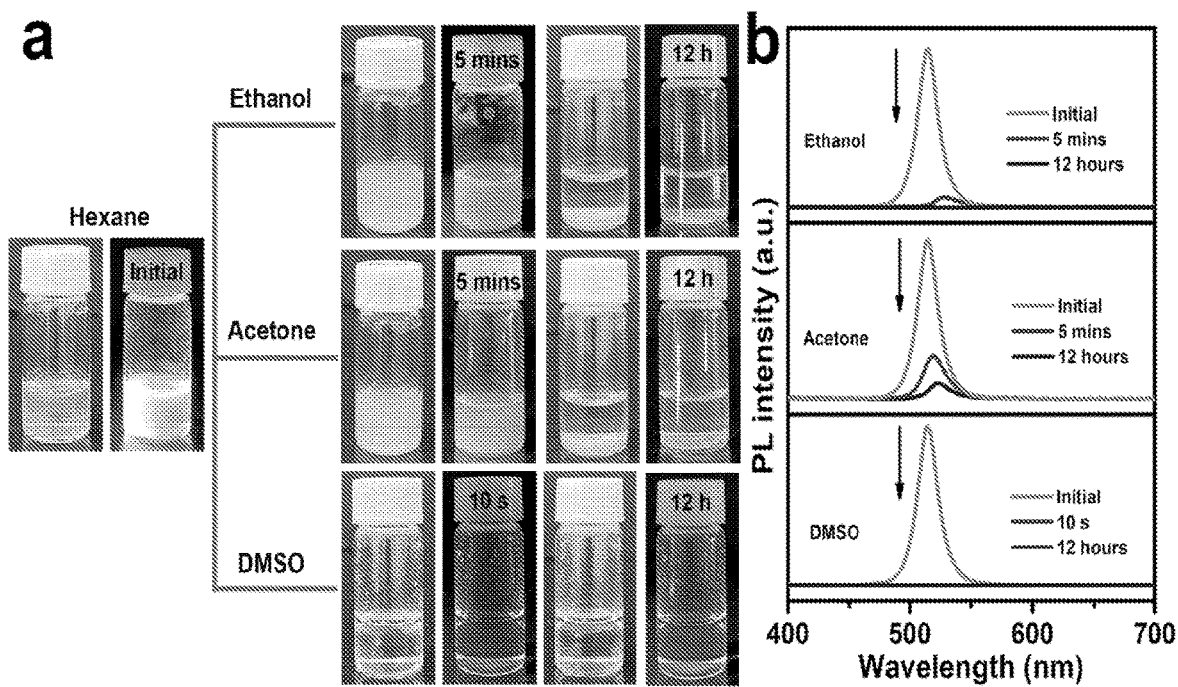
FIGS. 6a and 6b respectively show CsPbBr$_3$ nanocrystal prepared by hot injection immersed in ethanol, acetone, and dimethyl sulfoxide, and the changes in luminescence intensity corresponding to different immersion time.

After $CsPbBr_3$@CA nanosized mixed crystal prepared in Example 1 and $CsPbBr_{1.5}I_{1.5}$@CA nanosized mixed crystal prepared in Example 4 are respectively stored in various solvents for 7 days, and 30 days (FIGS. 5a, and 5c), the changes in luminescence intensity are shown in FIGS. 5c, and 5d. It can be seen from the figure that after the two nanosized mixed crystals are stored in various polar solvents for 30 days, the fluorescence intensity remains basically unchanged. In contrast, after the $CsPbBr_3$ nanocrystal prepared in Comparative Example 1 is stored in various polar solvents (as shown in FIG. 6a), the fluorescence intensity decreases over 12 h to almost no fluorescence intensity. As shown in FIG. 6b, $CsPbBr_3$ nanocrystal standing in the strong polar solvent dimethyl sulfoxide, completely loses the luminescence performance in 10 s.

It can be seen from the stability test results that the nanosized mixed crystal of cyanuric acid coated halide perovskite prepared by the microwave method in the present invention has excellent stability against polar solvents.

Application: Quantum Dot Brightness Enhancement Film

Figure 7:
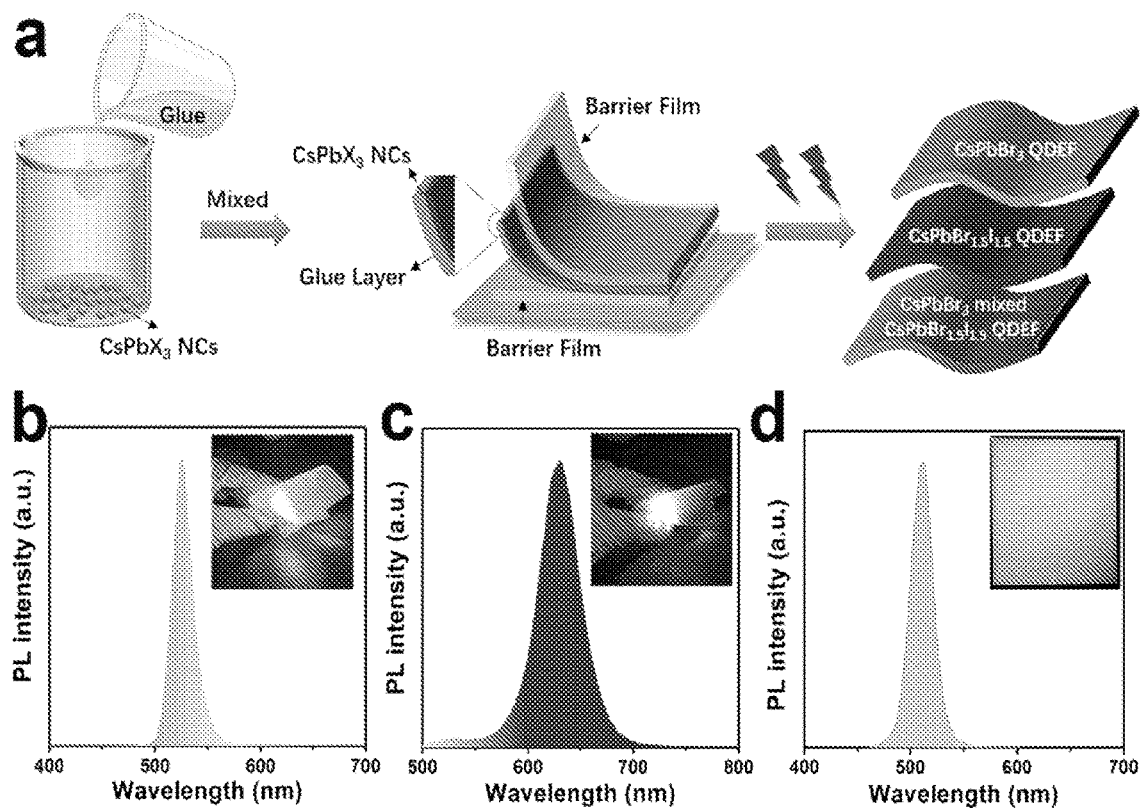
FIG. 7a is a schematic diagram showing the preparation process of a quantum dot brightness enhancement film.
FIG. 7b shows the luminescence and fluorescence spectrum of CsPbBr$_3$@CA quantum dot brightness enhancement film under UV irradiation.
FIG. 7c shows the luminescence and fluorescence spectrum of CsPbBr$_{1.5}$I$_{1.5}$@CA quantum dot brightness enhancement film under UV irradiation.
FIG. 7d shows the luminescence and fluorescence spectrum of CsPbBr$_{1.5}$I$_{1.5}$@CA quantum dot brightness enhancement film under UV irradiation.

The $CsPbBr3$@CA nanosized mixed crystal prepared in Example 1, the $CsPbBr_{1.5}I_{1.5}$@CA nanosized mixed crystal prepared in Example 4, and the $CsPbBr_3$ nanocrystal prepared in Comparative Example 1 were used as a luminescent material to prepare a quantum dot brightness enhancement film. The preparation process was as shown in FIG. 7a. The nanosized mixed crystal was ground and then added to an adhesive, or the $CsPbBr_3$ nanocrystal was directly added to the adhesive, and then it was evenly dispersed, encapsulated with two layers of barrier films, and cured under UV irradiation to obtain a quantum dot brightness enhancement film (QDEF).

Figure 8:
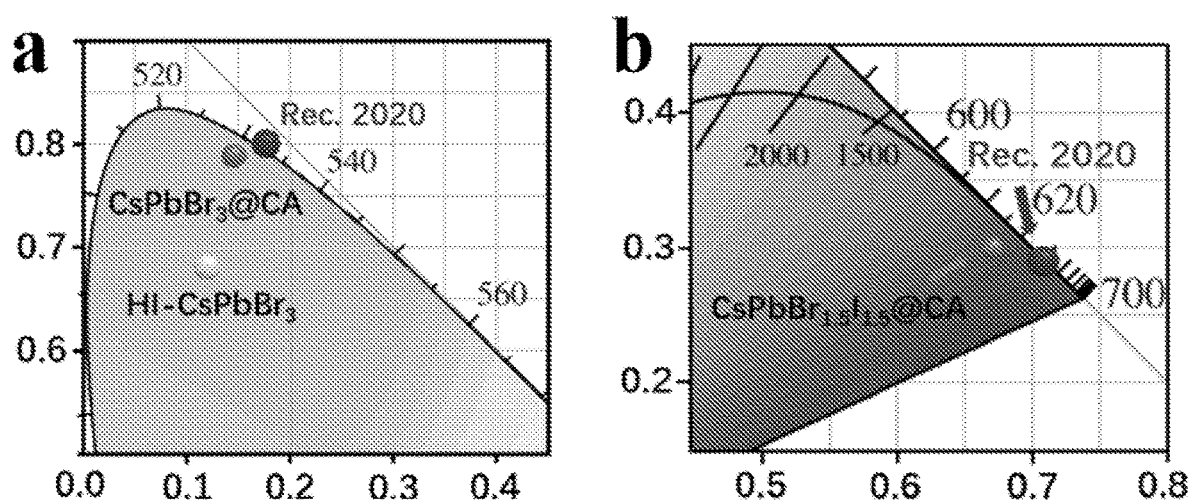
FIG. 8a shows the color points of CsPbBr$_3$ nanocrystals prepared by different methods.
FIG. 8b shows the color points of CsPbBr$_{1.5}$I$_{1.5}$@CA nanosized mixed crystal.

Depending on the luminescent material, green light emitting $CsPbBr_3$@CA QDEF, red light emitting $CsPbBr_{1.5}I_{1.5}$@CA QDEF, and green light emitting HI—$CsPbBr_3$ QDEF were respectively prepared. The emission wavelength, peak width at half height (as shown in FIGS. 7b-7d) and color point (as shown in FIGS. 8a, and 8b) of various quantum dot brightness enhancement films were tested. The relevant parameters are shown in Table 2 below.

TABLE 2

Luminescence parameters of various quantum dot brightness enhancement films

| Sample | Emission wavelength (nm) | Peak width at half height (nm) | Color point |
|---|---|---|---|
| $CsPbBr_3$@CA QDEF | 525 | 23 | (0.17, 0.79) |
| $CsPbBr_{1.5}I_{1.5}$@CA QDEF | 630 | 46 | (0.67, 0.30) |
| HI-$CsPbBr_3$ QDEF | 512 | 24 | (0.12, 0.68) |

As can be seen from the above table, compared with the green light emitting HI—$CsPbBr_3$ QDEF, $CsPbBr_3$@CA QDEF has a super-high color point (0.17, 0.79), which is very close to the Rec.2020 standard, and the emission wavelength and peak width at half height both meet the requires of Rec.2020 standard. Therefore, this material is very suitable for use in quantum dot liquid crystal displays.

Figure 9:
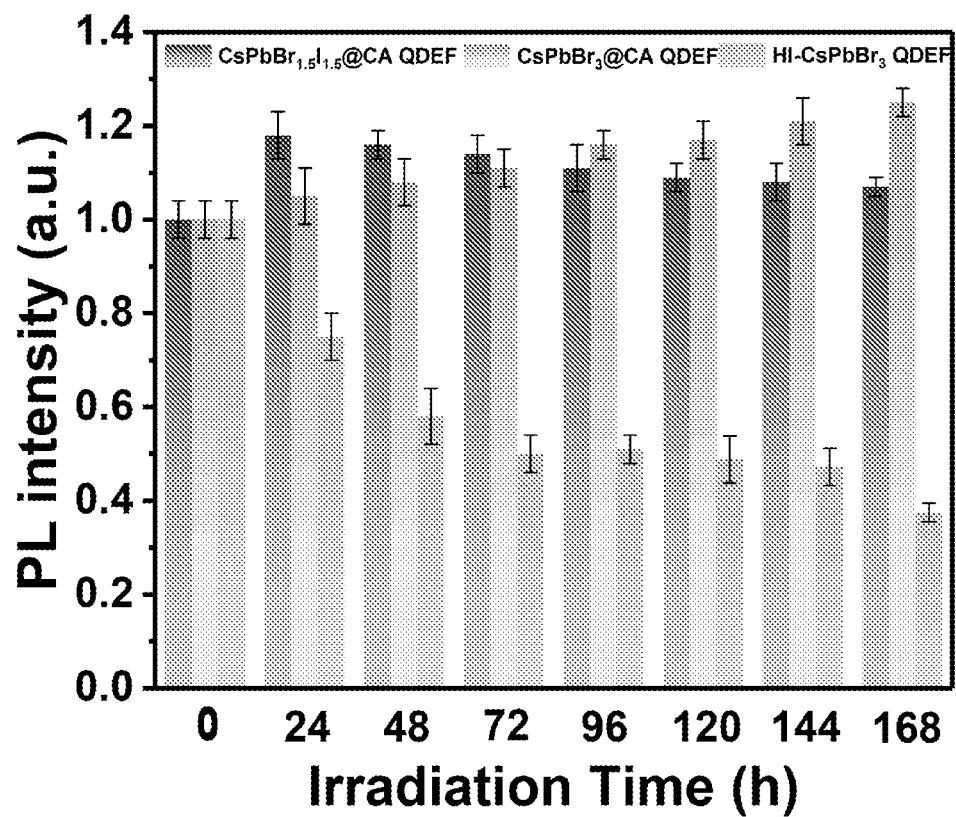
FIG. 9 shows the changes of luminescence intensity of CsPbBr$_3$@CA QDEF, CsPbBr$_{1.5}$I$_{1.5}$@CA QDEF, and HI—CsPbBr$_3$ QDEF under UV irradiation.

Moreover, the luminescence intensity of the three quantum dot brightness enhancement films prepared above as a function of irradiation time was further studied under UV irradiation ($\lambda$=365 nm, 490 mA). The results are shown in FIG. 9. The luminescence intensity of $CsPbBr_{1.5}I_{1.5}$@CA QDEF increases, then decreases and gradually become stable with the increase of UV irradiation time. The luminescence intensity of $CsPbBr_3$@CA QDEF increases with the increase of UV irradiation time. The luminescence intensity of HI—$CsPbBr_3$ QDEF decreases greatly with the increase of UV irradiation time. After up to 2 weeks of UV irradiation, the luminescence intensity of $CsPbBr_3$@CA QDEF and $CsPbBr_{1.5}I_{1.5}$@CA QDEF prepared in the present invention is higher than the initial luminescence intensity. This also shows that the quantum dot brightness enhancement film prepared with the nanosized mixed crystal of cyanuric acid coated halide perovskite prepared in the present invention has good photostability.

Application: Quantum Dot Liquid Crystal Display

Figure 10:
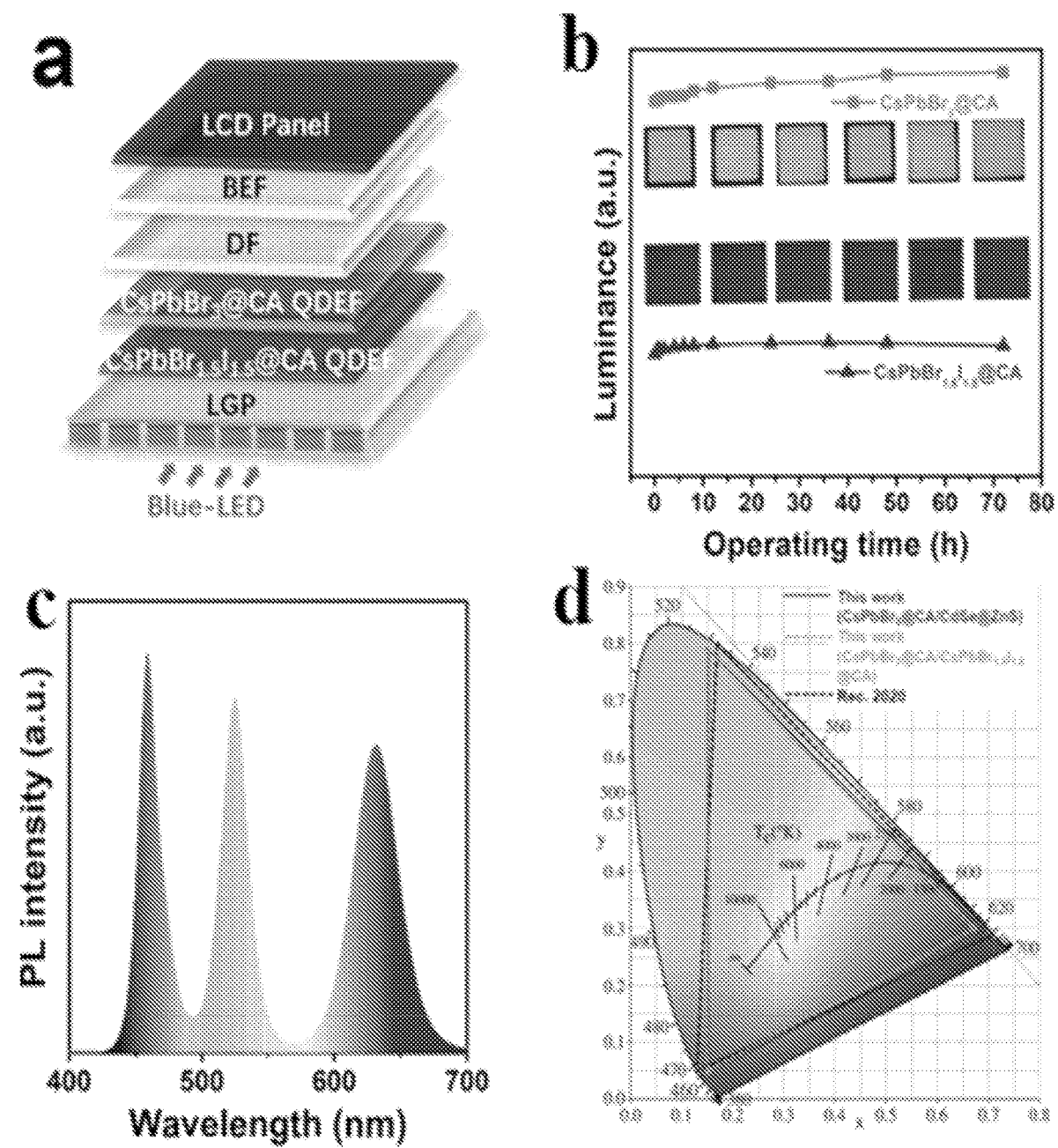
FIG. 10a is a schematic view of a quantum dot liquid crystal display.
FIG. 10b shows the brightness of CsPbBr$_3$@CA quantum dot brightness enhancement film and CsPbBr$_{1.5}$I$_{1.5}$@CA quantum dot brightness enhancement film as a function of running time of the display.
FIG. 10c shows a fluorescence spectrum of a composite film formed by CsPbBr$_3$@CA quantum dot brightness enhancement film overlapped on CsPbBr$_{1.5}$I$_{1.5}$@CA quantum dot brightness enhancement film.
FIG. 10d shows the color space of CsPbBr$_3$@CA quantum dot brightness enhancement film combined respectively with CsPbBr$_{1.5}$I$_{1.5}$@CA quantum dot brightness enhancement film, and CdSe@ZnS quantum dot brightness enhancement film.

The quantum dot brightness enhancement film prepared above is used in a quantum dot liquid crystal display. As shown in FIG. 10a, the constructed display structure comprises a liquid crystal display panel, a brightness enhancement film, a diffusion film, $CsPbBr_3$@CA QDEF green light emitting film, $CsPbBr_{1.5}I_{1.5}$@CA QDEF red light emitting film, a light guide plate, and a blue LED. The luminescence brightness of the green light emitting film and the red light emitting film as a function of running time is tested after the display runs. As shown in FIG. 10b, over 72 h of running, the luminescence brightness of the green light emitting film and the red light emitting film does not decrease, further demonstrating that the nanosized mixed crystal of cyanuric acid coated halide perovskite prepared in the present invention has excellent luminescence performance and stability.

Besides, FIG. 10c shows a fluorescence spectrum of white light generated by a composite film formed by a green light emitting film overlapped on a red light emitting film when exposed to blue light irradiation.

As shown in FIG. 10d, according to the chromaticity coordinate diagram of each quantum dot brightness enhancement film in the liquid crystal display, it can be known from calculation that the color space of the display having a combination of $CsPbBr_3$@CA QDEF green light emitting film and $CsPbBr_{1.5}I_{1.5}$@CA QDEF red light emitting film is 90% of Rec.2020 (where the color space is the ratio of the RGB triangle area of the display screen to the Rec.2020 standard area).

Further, the $CsPbBr_{1.5}I_{1.5}$@CA QDEF red light emitting film in the display is replaced by CdSe@ZnS red light emitting film, and the color space of the prepared display is 96% of Rec.2020.

The above-described embodiments are merely preferred embodiments for the purpose of fully illustrating the present invention, and the scope of the present invention is not limited thereto. Equivalent substitutions or modifications can be made by those skilled in the art based on the present invention, which are within the scope of the present invention as defined by the claims. The scope of the present invention is defined by the appended claims.

What is claimed is:

1. A method for preparing a nanosized mixed crystal of cyanuric acid coated halide perovskite, comprising steps of:
    (1) dispersing cesium halide, a lead salt, and urea in water, and stirring uniformly to obtain a mixed solution, wherein the lead salt is selected from the group consisting of lead bromide, lead nitrate, lead acetate, and a hydrate thereof and any combination thereof; and
    (2) adding phosphoric acid to the mixed solution, and subjecting to microwave heating, to obtain a solid after water is evaporated off, which is allowed to stand to obtain the cyanuric acid coated halide perovskite nanosized mixed crystal.

2. The method for preparing a nanosized mixed crystal of cyanuric acid coated halide perovskite according to claim 1, wherein in Step (1), a molar ratio of the lead salt to urea is 1:50-200 mmol/g.

3. The method for preparing a nanosized mixed crystal of cyanuric acid coated halide perovskite according to claim 1, wherein in Step (2), phosphoric acid is added in a volume at a ratio to the moles of the lead salt of 0.5-5:1 mL/mmol, and the phosphoric acid is an 85 wt % aqueous solution; and the power of the microwave heating is 600-850 W.

4. The method for preparing a nanosized mixed crystal of cyanuric acid coated halide perovskite according to claim 1, wherein the nanosized mixed crystal of cyanuric acid coated halide perovskite obtained in Step (2) is thermally treated, to adjust the emission wavelength of the nanosized mixed crystal, wherein the thermal treatment temperature is 50-120° C., and the thermal treatment time is 2 min-2 h.

5. A nanosized mixed crystal of cyanuric acid coated halide perovskite, prepared by the preparation method according to claim 1, wherein the halide perovskite has a general chemical formula of $CsPbX_3$, in which X is selected from the group consisting of Cl, Br, I and any combination thereof.

6. A quantum dot brightness enhancement film, obtained by sandwiching a light-emitting layer material between two layers of barrier films, and curing, wherein the light-emitting layer material is obtained by mixing the nanosized mixed crystal of cyanuric acid coated halide perovskite according to claim 5 with an adhesive.

7. The quantum dot brightness enhancement film according to claim 6, wherein when the halide perovskite is $CsPbBr_3$, a prepared $CsPbBr_3$@CA quantum dot brightness enhancement film emits green light under UV irradiation; and when the halide perovskite is $CsPbBr_{1.5}I_{1.5}$, a prepared $CsPbBr_{1.5}I_{1.5}$@CA quantum dot brightness enhancement film emits red light under UV irradiation.

8. The quantum dot brightness enhancement film according to claim 7, wherein the $CsPbBr_3$@CA quantum dot brightness enhancement film has a emission wavelength of 525 nm, and a peak width at half height of 23 nm; and the $CsPbBr_{1.5}I_{1.5}$@CA quantum dot brightness enhancement film has a emission wavelength of 630 nm, and a peak width at half height of 46 nm.

9. A quantum dot liquid crystal display, comprising sequentially, from top to bottom, a liquid crystal display panel, a brightness enhancement film, a diffusion film, a green light emitting film, a red light emitting film, a light guide plate, and a blue LED, wherein the green light emitting film is the $CsPbBr_3$@CA quantum dot brightness enhancement film according to claim 7.

10. The quantum dot liquid crystal display according to claim 9, wherein when the green light emitting film is a $CsPbBr_3$@CA quantum dot brightness enhancement film having a color point of (0.17, 0.79), and the red light emitting film is a $CsPbBr_{1.5}I_{1.5}$@CA quantum dot brightness enhancement film having a color point of (0.67, 0.30), the quantum dot liquid crystal display has a color space that is 90% of Rec.2020 standard; and when the green light emitting film is a $CsPbBr_3$@CA quantum dot brightness enhancement film having a color point of (0.17, 0.79), and the red light emitting film is a CdSe@ZnS quantum dot brightness enhancement film having a color point of (0.70, 0.29), the quantum dot liquid crystal display has a color space that is 96% of Rec.2020 standard.

* * * * *